Dec. 26, 1967  R. KIRBY  3,360,256
ADJUSTABLE PIPE RACK
Filed July 30, 1965  2 Sheets-Sheet 2
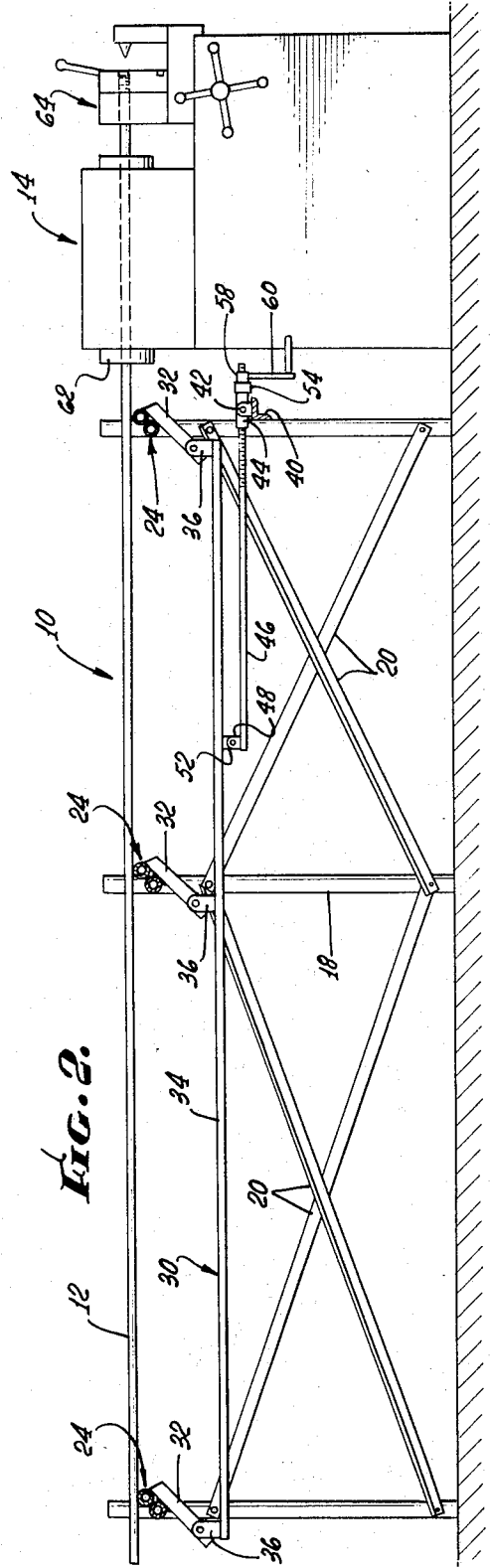
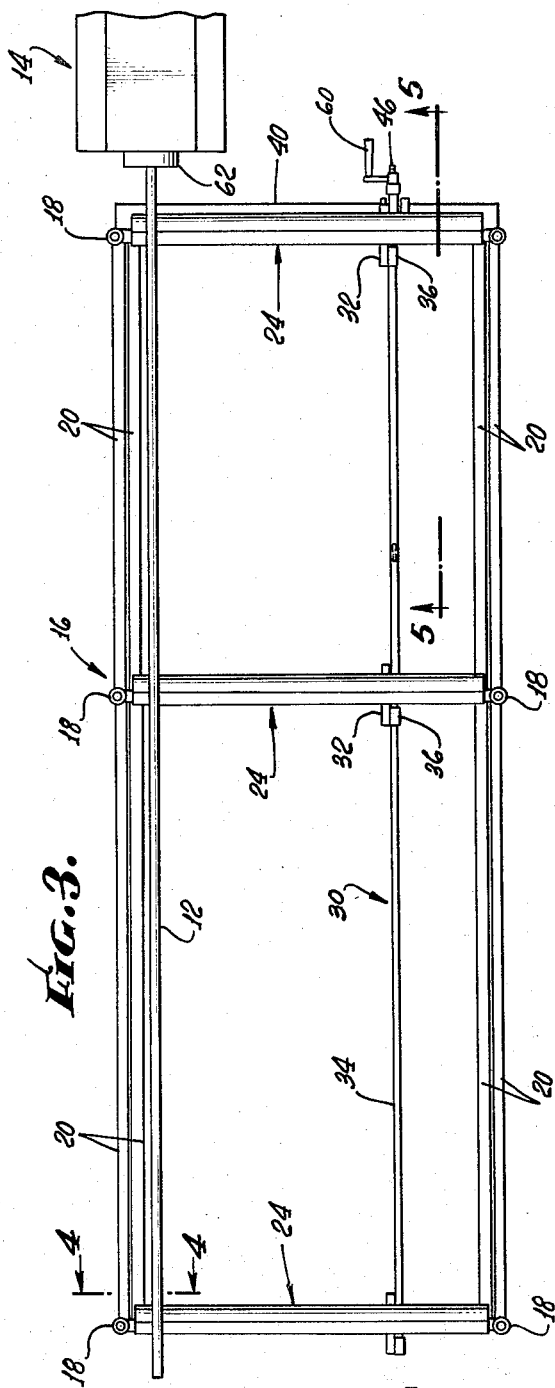
INVENTOR
ROBERT KIRBY
BY Beehler & Arant
ATTORNEYS.

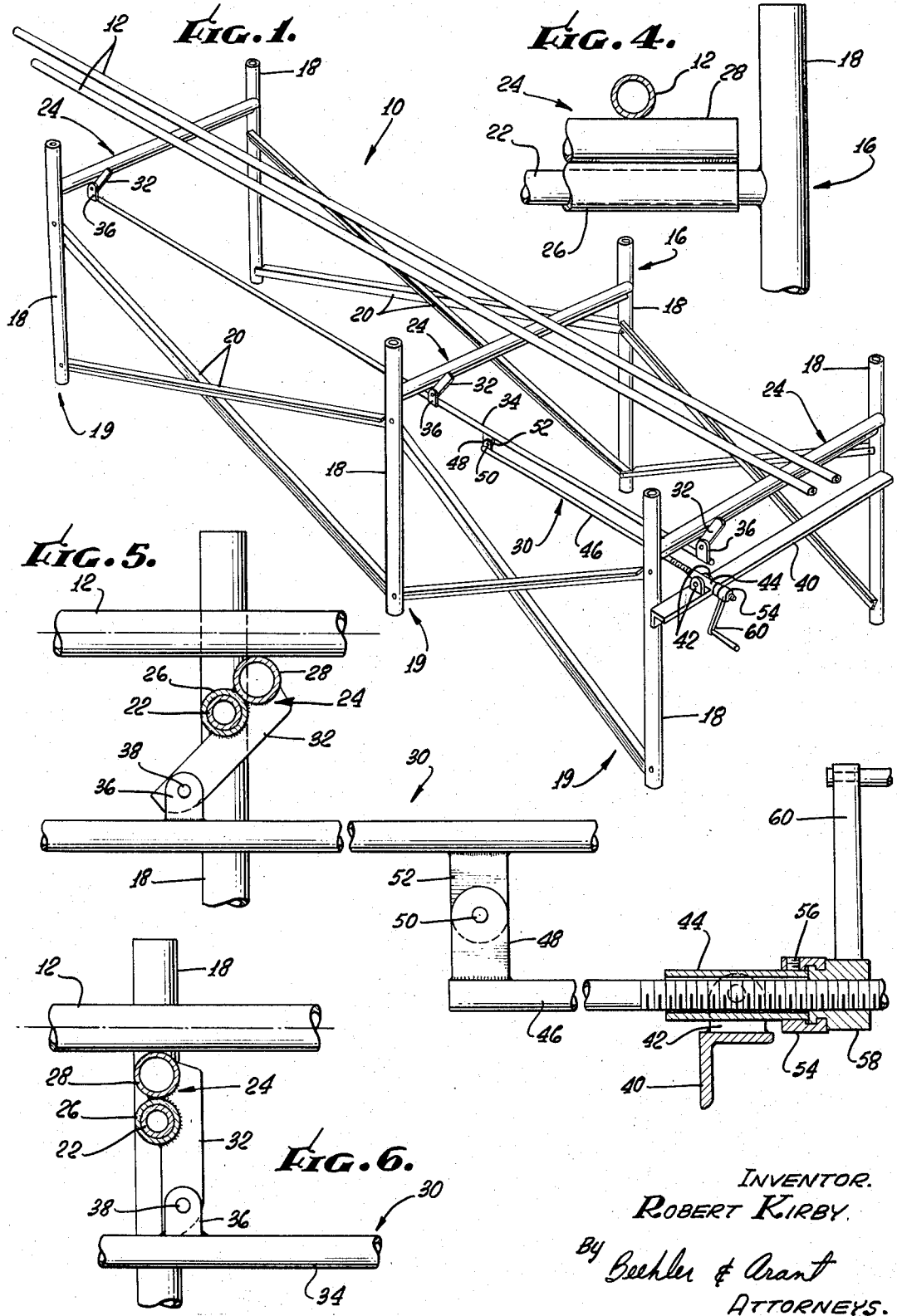

United States Patent Office 3,360,256
Patented Dec. 26, 1967

3,360,256
ADJUSTABLE PIPE RACK
Robert Kirby, 1500 Broadway,
San Pablo, Calif. 94806
Filed July 30, 1965, Ser. No. 476,040
5 Claims. (Cl. 269—296)

ABSTRACT OF THE DISCLOSURE

An elongated frame supported on pairs of legs adjacent opposite ends and extending between each pair of legs is an elongated pipe supporting element attached to a shaft which is pivotally mounted on the respective pairs of legs so that the pipe supporting element in each case is eccentric with respect to the pivot axis. An arm is rigidly attached to each shaft having a free end extending substantially radially therefrom. The free ends of the arms are in alignment in a direction perpendicular to the shafts and are connected together by a rod with pivotal connections. A crank assembly is mounted at one end of the frame and has a screw drive so that when the crank assembly is rotated the drive will shift the rod interconnecting the arms endwise causing the shafts to tilt and thereby elevate or depress the eccentrically mounted pipe supporting elements in order to raise or lower pipes which are supported directly upon those elements.

This invention relates generally to work holders and has more particular reference to a novel, vertically adjustable work holder for supporting and vertically positioning a work piece.

As will appear from the ensuing description, the work holder of this invention may be used for a variety of purposes. However, the work holder is primarily designed to serve as a pipe rack for supporting metal pipes while they are being marked off to selected lengths and for subsequently supporting and vertically positioning each pipe while it is being cut and threaded. For this reason, the present work holder will be disclosed herein primarily in connection with its use as a pipe rack and will be hereinafter referred to, in places, as a pipe rack. In view of what has been said above, however, it is evident that this disclosure and reference are intended to illustrate rather than limit the invention.

When installing plumbing systems, such as underground sprinkler systems, or overhead fire protection sprinkler systems, it is necessary to mark off and cut pipes to various lengths and to thread the ends of the pipes. The pipes are most conveniently marked off in this way by placing a number of the pipes side by side in such manner as to permit several of the pipes to be marked off at one time. This requires a work table which is sufficiently wide to support a number of pipes side by side. Thereafter, the pipes may be cut and threaded either by hand or with the aid of a motorized pipe threading machine. Such a machine is generally employed by most commercial plumbers because of the greater ease and speed with which the pipes may be threaded. In order to avoid excessive wear and other damage of the pipe threading machine and to produce proper pipe threads, it is essential to support the free end of each pipe while it is being threaded in such a way that the pipe axis is approximately aligned with the barrel of the threading machine. This is generally accomplished by supporting the outer end of the pipe on a pipe rack.

Most plumbing operations of the kind under discussion involve the cutting and threading of pipes of various diameters. Under these conditions, accurate alignment of a pipe being threaded with the barrel of the pipe threading machine requires a pipe rack which may be vertically adjusted to compensate for different pipe diameters. For example, the barrel of a typical pipe threading machine will accept a pipe of any diameter up to a maximum of four inches. When threading such a four-inch pipe, the supporting surface for the free end of the pipe must be located approximately two inches below the axis of the barrel of the pipe threading machine. When threading a one-inch pipe, on the other hand, the supporting surface must be located approximately one-half inch below the barrel axis. Pipes of other diameters require correspondingly different vertical distances between the supporting surface and the barrel axis. A pipe rack intended to support pipes of different diameters, therefore, must be vertically adjustable to vary the vertical spacing between the pipe supporting surface of the rack and the barrel axis of the pipe threading machine.

At this point, therefore, it is evident that the ideal pipe rack will have a pipe supporting surface which is wide enough to accommodate a number of pipes side by side and which may be adjusted in elevation through a range compatible with the pipe threading machine to be used in conjunction with the pipe rack.

The ideal pipe rack will also be readily portable. Thus, underground sprinkler systems and other plumbing systems can be most quickly and economically installed when the pipes for these systems are marked to length, cut, and threaded directly at the job site. At the present time, however, the pipes for such plumbing systems are commonly cut to length and threaded at the plant and are then tagged and packaged for shipment to the job site. This existing method of handling the pipes is due primarily to the lack of a suitable adjustable pipe rack for use in the field, particularly a pipe rack which may be readily transported from one job site to another.

The present invention provides a vertically adjustable work holder which is uniquely constructed and arranged to serve as a pipe rack for supporting a number of pipes side by side while they are marked off to length and for sbsequently supporting and vertically positioning the pipes while they are being cut and threaded. As noted earlier, however, the principal features of the invention may be embodied in work holders for other purposes so that the invention should not be regarded as limited in usefulness to pipe racks.

Accordingly, it is a general object of the invention to provide a new and improved vertically adjusted work holder.

Another object of the invention is to provide an adjustable work holder which is uniquely adapted for use as a pipe rack for supporting a number of pipes side by side while they are being marked off to length and for subsequently supporting and vertically positioning each pipe while it is being cut and threaded in a motorized pipe threading machine.

A further object of the invention is to provide an adjustable work holder of the character described which may be readily collapsed and reassembled for convenience of transportation from one job site to another.

Other objects, advantages, and features of the invention will become readily evident as the description proceeds.

With these and such other objects in view, the invention consists in the construction, arrangement and combination of the various parts of the device, whereby the objects contemplated are attained as hereinafter set forth, pointed out in the appended claims, and illustrated in the accompanying drawings.

In these drawings:

FIGURE 1 is a perspective view of an adjustable pipe rack according to the invention;

FIGURE 2 is a side elevation of the pipe rack installed in operative relation to a conventional, motorized pipe threading machine;

FIGURE 3 is a plan view of the pipe rack in FIGURE 2;

FIGURE 4 is an enlarged section taken on line 4—4 in FIGURE 3;

FIGURE 5 is an enlarged section taken on line 5—5 in FIGURE 3 and illustrating certain vertically adjustable pipe supporting structure for the rack in one position of adjustment; and FIGURE 6 is a fragmentary view of the left hand end of the structure illustrated in FIGURE 5 and showing the structure in another position of vertical adjustment.

The work holder, or pipe rack 10, illustrated in these drawings is designed to support a number of pipes 12 side by side while they are being marked off to length and thereafter to support the free end of each pipe while its opposite end is being cut and threaded. For this reason, FIGURES 2 and 3 illustrate a conventional pipe threading machine 14 with which the pipe rack 10 may be used. While only two pipes have been illustrated on the rack in FIGURE 1, it is readily evident that a relatively large number of pipes may be placed side by side on the rack.

Pipe rack 10 comprises an elongate supporting frame 16. Along each side of this frame are a number of upright supporting legs 18. Each leg at one side of the frame is aligned transversely of the frame with a leg at the opposite side of the frame to form a leg pair 19. The legs 18 at each side of the frame are joined by a series of diagonal cross braces 20. These cross braces may be bolted or otherwise releasably secured to the legs to permit the frame 16 to be quickly disassembled and subsequently reassembled for convenience of transportation from one job site to another.

Extending between the upper ends of the legs 18 of each leg pair 19 is a cylindrical bearing shaft 22. The bearing shafts 22 are welded or otherwise rigidly joined to the adjacent legs 18 and are located approximately in a common horizontal plane. Each bearing shaft may comprise a cylindrical pipe or tube, as shown.

Rotatable on each bearing shaft 22 is a vertically adjustable work or pipe support 24. Each pipe support 24 comprises a bearing sleeve 26 rotatable on and substantially coextensive with the respective bearing shaft 22. Extending lengthwise of and peripherally welded or otherwise rigidly joined to each bearing sleeve 26 is a work or pipe engaging member 28. Each pipe engaging member 28 is substantially coextensive with its respective bearing sleeve 26 and may comprise a cylindrical pipe or tube as shown.

At this point, it is evident that each pipe support 24 is rotatable about its associated bearing shaft 22 to vary the elevation of its respective pipe engaging member 28. Pipe supports 24 are rotatable between lower retracted positions, wherein the pipe engaging members 28 of the supports are located approximately in a common horizontal plane with the bearing shafts 22, and upper extended or raised positions, shown in FIGURE 6, wherein each pipe engaging member is located directly over its associated bearing shaft 22.

Pipe rack 10 is equipped with elevating means 30 for raising and lowering the pipe supports 24 in unison in such a way as to maintain the upper surfaces of the pipe engaging members 28 approximately in a common horizontal plane. Elevating means 30 comprises an arm 32 welded or otherwise rigidly joined at one end to the bearing sleeve 26 and the pipe engaging member 28 of each pipe support 24. Arms 32 extend generaly radially of and are disposed substantially in a common plane normal to the bearing sleeves 26. Extending lengthwise of the frame 16, below the pipe supports 24 and in the plane of the pipe support arms 32, is a connecting rod 34. Brackets 36 are welded to the upper surface of this rod adjacent the work supports 24, respectively. The outer end of each pipe support arm 32 is pivotally connected at 38 to the adjacent connecting rod bracket 36. At this point, it is evident that endwise movement of the connecting rod 34 is effective to raise and lower the pipe supports 24 in unison. The brackets 36 are located along the connecting rod 34 in such a way that the upper surfaces of the pipe engaging members 28 of the work supports remain in the common horizontal plane during this unified vertical movement thereof.

Extending horizontally between the legs 18 at one end of the frame 16, below the adjacent pipe support 24 is a cross member 40. The ends of this cross member are bolted or otherwise secured to the adjacent legs. Welded to the upper surface of this cross member are a pair of spaced brackets 42 which pivotally mount therebetween a bearing sleeve 44. A threaded shaft 46 extends rotatably through this bearing sleeve. Welded to the inner end of shaft 46 is an upstanding bracket 48. The upper end of this bracket is pivotally connected at 50 to the lower end of a depending bracket 52 on the connecting rod 34. Fixed to the outer end of the bearing sleeve 44 is an internally, circumferentially grooved and flanged retaining sleeve 54. A set screw 56 secures this retaining sleeve to the bearing sleeve 44.

Threaded on the outer end of the shaft 46 is a nut 58. The inner end of this nut is rotatably fitted within the outer end of the retaining sleeve 54 and is externally circumferentially grooved and flanged to interengage the internal groove and flange in the retaining sleeve. The nut 58 is thereby permitted to rotate freely but is restrained against axial movement relative to the bearing sleeve 44 and the retaining sleeve 54. Rigidly joined to and extending radially from the nut 58 is a crank handle 60 by which the nut may be rotated.

It is now evident that rotation of the handle 60 is effective to axially move the connecting rod 34 and thereby to raise and lower the pipe supports 24 in unison. The pipes 12, when supported on the rack 19, rest on the upper surfaces of the pipe engaging members 28 of the pipe supports 24 whereby the pipes raise and lower with the pipe supports. As already noted, the upper surfaces of the pipe engaging members 28 remain in a common horizontal plane during vertical movement of the pipe supports. Accordingly, the pipes 12 remain horizontal as they are raised and lowered by the pipe supports.

In use, the pipe rack 10 is installed in front of the pipe threading machine 14, in the manner illustrated in FIGURES 2 and 3. A number of pipes to be cut and threaded are then placed side by side on the pipe supports 24 of the rack. After marking off the pipes to desired lengths, the pipes are cut to size and threaded in the pipe threading machine 14. When a pipe is to be threaded, the pipe supports 24 are elevated or lowered, as necessary, until the axis of the pipe is located in a common horizontal plane with the axis of the barrel 62 of the pipe threading machine 14. The pipe is then moved laterally of the rack 10 to the position illustrated in FIGURE 3, wherein the axis of the pipe is aligned with the barrel axis, and the pipe is advanced axially through the barrel into the pipe threading mechanism 64 of the machine. When a pipe of different diameter is to be threaded, the pipe supports 24 are raised or lowered, as necessary, to compensate for the different diameter of the pipe.

While the invention has herein been disclosed in what is presently conceived to be its most practical and preferred embodiment, it is apparent that various modifications in the design arrangement of parts, and instrumentalities of the invention are possible within the spirit and scope of the following claims.

What is claimed as new and is desired to be secured by Letters Patent is:

1. An adjustable pipe rack comprising: an elongate frame including upright supporting legs spaced along opposite sides of said frame and means releasably joining said legs, each leg along one side of said frame being aligned laterally of said frame with a corresponding leg at the opposite side of said frame to form a leg pair, a horizontal bearing shaft extending between and rigidly joined to the legs of each leg pair, the several bearing shafts on said frame being located approximately in a common horizontal plane, a pipe support on each bearing shaft including a bearing sleeve rotatable on the respective bearing shaft and a pipe engaging member extending lengthwise of and peripherally secured to the respective bearing sleeve, the bearing sleeve and pipe engaging member of each pipe support being substantially coextensive with the corresponding bearing shaft, an arm rigidly secured at one end to each pipe support and extending generally radially of the respective bearing sleeve, said arms being generally aligned lengthwise of said frame, a connecting rod extending between and pivotally attached to the opposite ends of said arms, a shaft pivotally attached at one end to said connecting rod and extending lengthwise of said rod to one end of said frame, the opposite end of said shaft being threaded, a nut threaded on said opposite end of said shaft, bearing means on said one end of said frame supporting said nut for rotation and against axial movement, and means for rotating said nut.

2. A work holder comprising: a frame, at least a pair of spaced, generally parallel and horizontal bearing shafts mounted on said frame at positions spaced therealong, a work support rotatably mounted on each bearing shaft including an elongated work-engaging member extending parallel to and radially spaced from the respective bearing shaft, and means for simultaneously rotating said work supports about their respective bearing shafts to rotatably elevate and lower said work engaging members in unison in such a way as to maintain said members in a common horizontal plane, said means for simultaneously rotating said work supports comprising radial arms rigidly secured at one end to said work supports, respectively, said arms being approximately aligned endwise of said frame, a connecting rod extending between and pivotally attached to the other ends of said arms, a shaft pivotally attached at one end to said connecting rod and extending lengthwise of said rod to one end of said frame, the opposite end of said shaft being threaded, a nut threaded on said opposite end of said shaft, bearing means on said one end of said frame supporting said nut for rotation and against axial movement, and means for rotating said nut.

3. An adjustable pipe holder comprising a supporting frame, at least two generally parallel horizontal shaft members pivotally mounted on said frame, an elongated work engaging element eccentric with respect to and substantially parallel to each said shaft for supporting a plurality of pipes in side by side relationship, an arm connected jointly to each said shaft member and adjacent work engaging element and having free ends extending substantially radially with respect to said shaft, said arms being substantially in alignment with each other in a direction normal to said shafts, means of fixed length connecting said free ends of said arms, and a crank assembly on said frame directly connected to said means having an operating drive in a direction substantially in alignment with said free ends of said arms whereby to tilt said work engaging members up and down to desired positions of adjustment.

4. An adjustable pipe holder as in claim 3 wherein said means comprises an elongated rod and said crank assembly comprises a screw drive adjacent one end of the frame substantially in alignment with said rod and a crank handle extending radially from said screw drive.

5. An adjustable pipe holder as in claim 3 wherein supporting legs on said frame extend upwardly above said work engaging elements to confine pipe lengths thereto during use.

References Cited

UNITED STATES PATENTS 501,521   7/1893   Marsh _____ 108—147 X

LESTER M. SWINGLE, *Primary Examiner.*